United States Patent
Kao

(10) Patent No.: US 10,815,350 B2
(45) Date of Patent: Oct. 27, 2020

(54) KEYCAP STRUCTURE AND MANUFACTURING METHOD THEREOF

(71) Applicant: Primax Electronics Ltd., Taipei (TW)

(72) Inventor: Han-Pin Kao, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 251 days.

(21) Appl. No.: 16/044,721

(22) Filed: Jul. 25, 2018

(65) Prior Publication Data
US 2019/0352478 A1    Nov. 21, 2019

(30) Foreign Application Priority Data
May 18, 2018    (TW) .............................. 107117050 A

(51) Int. Cl.
C08J 7/04    (2020.01)
H01H 13/04    (2006.01)

(52) U.S. Cl.
CPC .............. *C08J 7/042* (2013.01); *H01H 13/04* (2013.01); *H01H 2239/034* (2013.01)

(58) Field of Classification Search
CPC ...................................................... C08J 7/042
USPC ...................................................... 428/423.1
See application file for complete search history.

(56) References Cited

U.S. PATENT DOCUMENTS

2010/0187079 A1*  7/2010  Dumont ................. H01H 13/83
                                                          200/341

* cited by examiner

*Primary Examiner* — Brent T O'Hern
(74) *Attorney, Agent, or Firm* — Kirton McConkie; Evan R. Witt

(57) ABSTRACT

A keycap structure includes a keycap body and a single coating layer. The keycap body has a top surface and a bottom surface. The single coating layer is formed on the top surface. The single coating layer is formed by coating a paint. The paint is a UV paint or a PU paint.

11 Claims, 2 Drawing Sheets

KEYCAP STRUCTURE AND MANUFACTURING METHOD THEREOF

FIELD OF THE INVENTION

The present invention relates to an input device, and more particularly to a keycap structure.

BACKGROUND OF THE INVENTION

In modern societies, electronic products become indispensable parts in human lives. The electronic products are applied in many sectors, including food, clothing, housing, transportation, education and entertainment. Generally, the electronic product is equipped with a keyboard.

As known, a keycap structure of the keyboard is frequently pressed by the user. Generally, a multi-layered coating structure is formed on the keycap structure in order to increase the hardness and the abrasive resistance of the keycap structure. Moreover, U.S. Pat. No. 5,804,299 discloses a key switch with a protective coating layer in order to increase the hardness and the abrasive resistance of the keycap structure. For example, a light-shielding coating layer, a primer layer and a protective layer are sequentially formed on a main body of the keycap structure. Consequently, the abrasive resistance of the key switch is increased. However, the process of fabricating the keycap structure with the multi-layered coating structure is time-consuming, and the keycap structure with the multi-layered coating structure increases the fabricating cost of the key.

Therefore, there is a need of providing an easily-produced keycap structure with excellent hardness and abrasive resistance in order to overcome the drawbacks of the conventional technologies.

SUMMARY OF THE INVENTION

The present invention provides an easily-produced keycap structure with excellent hardness and abrasive resistance.

In accordance with an aspect of the present invention, there is provided a keycap structure. The keycap structure includes a keycap body and a single coating layer. The keycap body has a top surface and a bottom surface. The single coating layer is formed on the top surface. The single coating layer is formed by coating a paint. The paint is a UV paint or a PU paint.

In an embodiment, a thickness of the single coating layer is in a range between 10 μm and 50 μm.

In an embodiment, the UV paint contains 50 to 80 weight parts of oligomer and 20 to 50 weight parts of monomer.

In an embodiment, the oligomer is selected from at least one of epoxy acrylate, polyurethane acrylate, polyester acrylate, polyether acrylate, amine acrylate and acrylic ester.

In an embodiment, the monomer is selected from at least one of a polyether compound or an alkoxyalkyl compound.

In an embodiment, the UV paint further contains 0 to 20 weight parts of photo initiator, 0 to 20 weight parts of additive or 0 to 20 weight parts of solvent.

In an embodiment, the photo initiator is a radical photo initiator or a cationic photo initiator.

In an embodiment, the additive is selected from at least one of a leveling agent, a wetting agent, a fogging agent, an adhesion promoter, a rheological agent, a stabilizer, a pigment and a filler.

In an embodiment, the PU paint contains 40 to 80 weight parts of main agent, 1 to 20 weight parts of hardener and 10 to 80 weight parts of solvent.

In an embodiment, the main again contains a polyol, and the polyol is selected from at least one of polyester polyol, polyether polyol and a polyol with other functional group.

In an embodiment, the hardener is selected from at least one of isocyanate, diisocyanate and polyisocyanate.

In an embodiment, the PU paint further contains 0 to 20 weight parts of additive. The additive is selected from at least one of a crosslinking agent, a leveling agent, a wetting agent, a fogging agent, an adhesion promoter, a rheological agent, a stabilizer, a pigment and a filler.

In an embodiment, a hollow pattern is formed in a surface of the single coating layer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
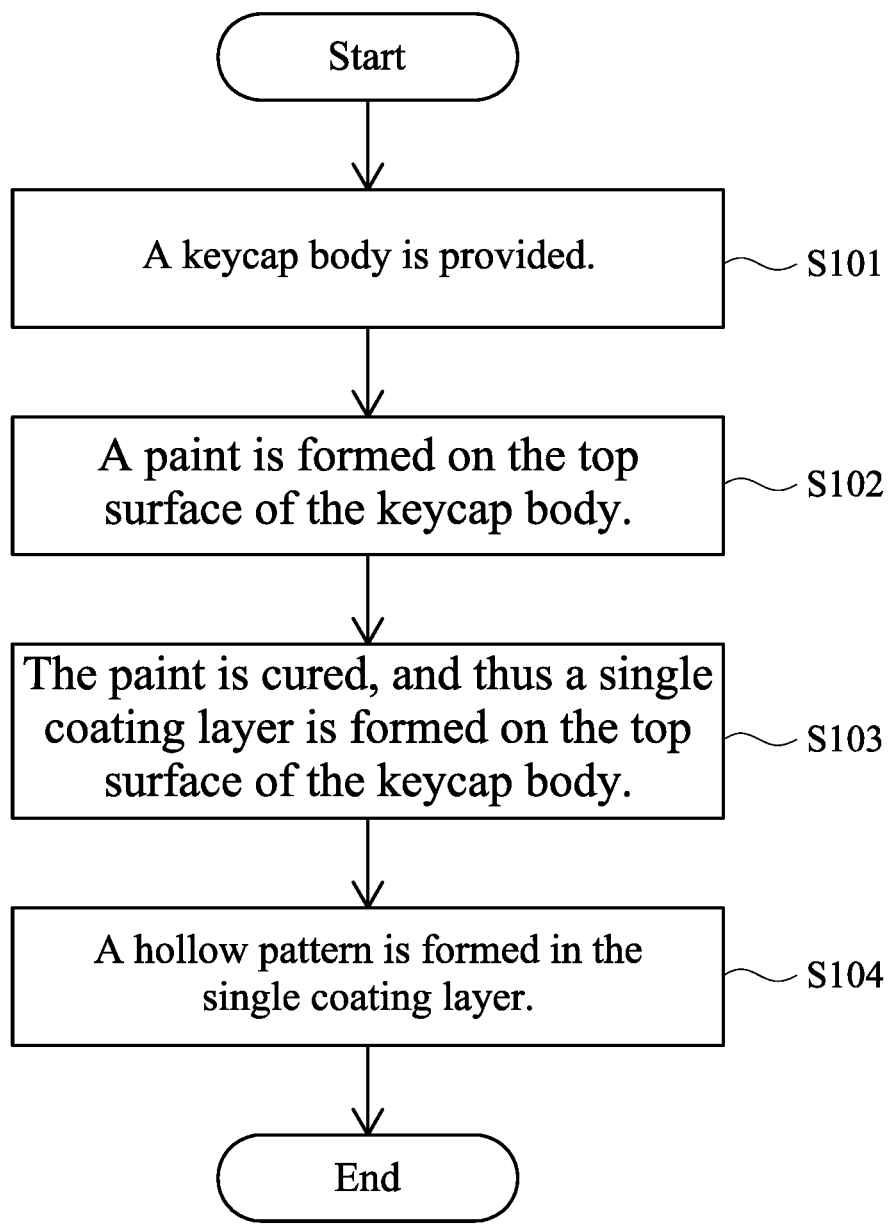
FIG. 1 is a flowchart illustrating a method for manufacturing a keycap structure according to an embodiment of the present invention.
Figure 2:
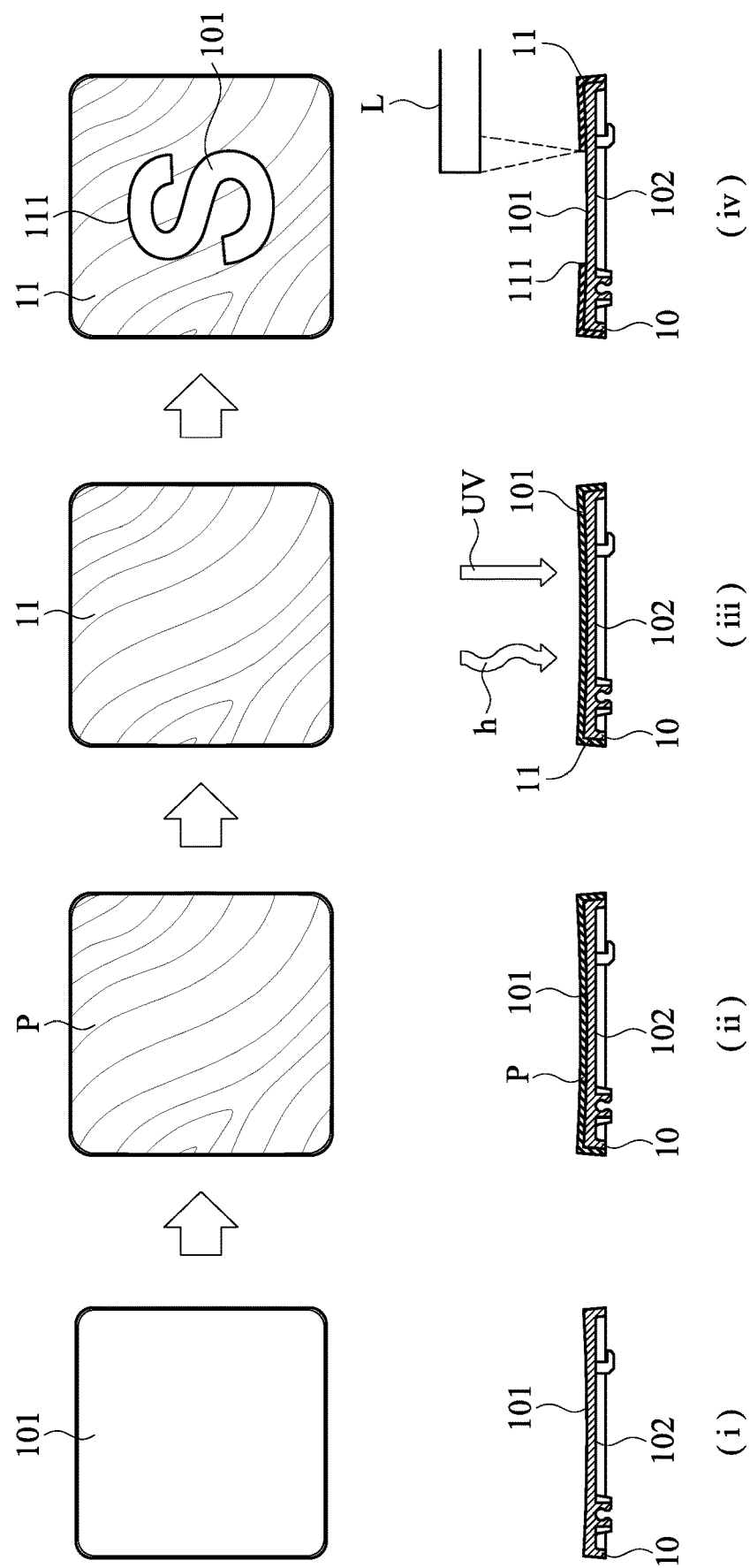
FIG. 2 schematically illustrates the steps of the method for manufacturing the keycap structure according to the embodiment of the present invention.

Please refer to FIGS. 1 and 2. FIG. 1 is a flowchart illustrating a method for manufacturing a keycap structure according to an embodiment of the present invention. FIG. 2 schematically illustrates the steps of the method for manufacturing the keycap structure according to the embodiment of the present invention. The keycap structure of the present invention can be applied to the keys of various electronic devices.

Firstly, a keycap body 10 is provided (Step S101). In the step S101 of FIG. 1 and the drawing (i) FIG. 2, the keycap body 10 has a top surface 101 and a bottom surface 102. Preferably but not exclusively, the keycap body 10 is made of ABS (acrylonitrile butadiene styrene) resin.

Then, a paint P is formed on the top surface 101 of the keycap body 10. In the step S102 of FIG. 1 and the drawing (ii) FIG. 2, a spray gun such as an automatic spray gun or a manual spray gun is used for coating the paint P on the top surface 101 of the keycap body 10. For example, the paint P is a UV paint or a PU paint.

The UV paint contains 50 to 80 weight parts of oligomer and 20 to 50 weight parts of monomer. The oligomer is selected from at least one of epoxy acrylate, polyurethane acrylate (PUA), polyester acrylate, polyether acrylate, amine acrylate and acrylic ester. The monomer is selected from at least one of a polyether compound or an alkoxyalkyl compound. For increasing the curing efficiency of the UV paint, the UV paint further contains 0 to 20 weight parts of photo initiator. For example, the photo initiator is a radical photo initiator or a cationic photo initiator. Optionally, the UV paint contains 0 to 20 weight parts of additive. The additive is used for improving the properties of the UV paint. For example, the additive is selected from at least one of a leveling agent, a wetting agent, a fogging agent, an adhesion promoter, a rheological agent, a stabilizer, a pigment and a filler. Optionally, the UV paint contains 0 to 20 weight parts of solvent. The solvent is used to adjust the concentration of the UV paint. Consequently, the UV paint has different viscosity or fluidity.

The PU paint contains 40 to 80 weight parts of main agent, 1 to 20 weight parts of hardener and 10 to 80 weight parts of solvent. The main again contains a polyol. The polyol is selected from at least one of polyester polyol, polyether polyol and the polyol with any other appropriate functional group. The hardener is selected from at least one of isocyanate, diisocyanate and polyisocyanate (e.g., TDI, MD1 or PAPI). Optionally, the PU paint contains 0 to 20 weight parts of additive. For example, the additive is selected from at least one of a crosslinking agent, a leveling agent, a wetting agent, a fogging agent, an adhesion promoter, a rheological agent, a stabilizer, a pigment and a filler.

Then, the paint P is cured, and thus a single coating layer 11 is formed on the top surface 101 of the keycap body 10 (Step S103). In the step S103 of FIG. 1 and the drawing (iii) FIG. 2, the paint P on the top surface 101 of the keycap body 10 is irradiated by UV light or baked by a heat source h. In case that the paint P is the UV paint, the paint P on the top surface 101 of the keycap body 10 is cured through the UV light irradiation. In a preferred embodiment, the paint P is irradiated by UV light while the paint P is baked at a temperature from 20° C. to 80° C. Consequently, the solvent in the UV paint is vaporized. In case that the paint P is the PU paint, the paint P on the top surface 101 of the keycap body 10 is baked by the heat source h. In a preferred embodiment, the heating temperature of the heat source h is in the range between 50° C. and 100° C. After the paint P is cured, the single coating layer 11 is formed on the top surface 101 of the keycap body 10. In other words, it is not necessary to previously form an adhesion-enhancing primer layer on the top surface 101 of the keycap body 10. In an embodiment, the thickness of the single coating layer 11 is in the range between 10 µm and 50 µm.

Then, a hollow pattern 111 is formed in the single coating layer 11 (Step S104). In the step S104 of FIG. 1 and the drawing (iv) FIG. 2, a laser cutting device L emits a laser beam to cut and engrave the single coating layer 11, so that the hollow pattern 111 is formed in the single coating layer 11. The hollow pattern 111 is formed as a character region or a symbol region of the keycap structure. In this embodiment, the hollow pattern 111 runs through the single coating layer 11. Consequently, the color of the keycap body 10 is exposed through the hollow pattern 111. As mentioned above, the hollow pattern 111 runs through the single coating layer 11. In some other embodiments, the hollow pattern 111 does not run through the single coating layer 11. For example, the hollow pattern 111 is formed in the surface of the single coating layer 11 and a pigment with a different color is coated on the hollow pattern 111. Since the hollow pattern 111 has the different color, the efficacy of recognizing the character or the symbol is enhanced.

From the above descriptions, the keycap structure of the present invention has the single coating layer. Since the primer layer for increasing the adhesion to the protective coating layer is not necessarily formed on the surface of the keycap surface, the method of manufacturing the keycap structure is simplified. Moreover, since the thickness of the keycap structure is reduced, the overall thickness of the keyboard is reduced. Moreover, the single coating layer of the keycap structure also possesses excellent hardness and abrasive resistance. Consequently, after the single coating layer is engraved through the laser beam, the character region or the symbol region of the keycap structure is formed. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keycap structure, comprising:
   a keycap body having a top surface and a bottom surface; and
   a single coating layer formed on the top surface, wherein the single coating layer is a paint, wherein the paint is an ultraviolet paint (UV paint) containing 50 to 80 weight parts of oligomer and 20 to 50 weight parts of monomer or a polyurethane paint (PU paint) containing 40 to 80 weight parts of main agent, 1 to 20 weight parts of hardener, and 10 to 80 weight parts of solvent.

2. The keycap structure according to claim 1, wherein a thickness of the single coating layer is in a range between 10 µm and 50 µm.

3. The keycap structure according to claim 1, wherein the oligomer is selected from at least one of epoxy acrylate, polyurethane acrylate, polyester acrylate, polyether acrylate, amine acrylate and acrylic ester.

4. The keycap structure according to claim wherein the monomer is selected from at least one of a polyether compound or an alkoxyalkyl compound.

5. The keycap structure according to claim 1, wherein the UV paint further contains no more than 20 weight parts of photo initiator, no more than 20 weight parts of additive, or no more than 20 weight parts of solvent.

6. The keycap structure according to claim 5, wherein the photo initiator is a radical photo initiator or a cationic photo initiator.

7. The keycap structure according to claim 5, wherein the additive is selected from at least one of a leveling agent, a wetting agent, a fogging agent, an adhesion promoter, a rheological agent, a stabilizer, a pigment and a filler.

8. The keycap structure according to claim 1, wherein the main agent contains a polyol, and the polyol is selected from at least one of polyester polyol, polyether polyol and a polyol with other functional group.

9. The keycap structure according to claim 1, wherein the hardener is selected from at least one of isocyanate, diisocyanate and polyisocyanate.

10. The keycap structure according to claim 1, wherein the PU paint further contains no more than 20 weight parts of additive, wherein the additive is selected from at least one of a crosslinking agent, a leveling agent, a wetting agent, a fogging agent, an adhesion promoter, a rheological agent, a stabilizer, a pigment and a filler.

11. The keycap structure according to claim 1, wherein a hollow pattern is formed in a surface of the single coating layer.

* * * * *